United States Patent
Miszewski et al.

(10) Patent No.: US 8,874,407 B2
(45) Date of Patent: Oct. 28, 2014

(54) SYSTEM FOR DETERMINATION OF DOWNHOLE POSITION

(75) Inventors: Antoni Miszewski, Devon (GB); Richard Stevens, Devon (GB); Benjamin Brooking, Tiverton (GB)

(73) Assignee: Antech Limited, Exeter (GB)

( * ) Notice: Subject to any disclaimer, the term of this patent is extended or adjusted under 35 U.S.C. 154(b) by 339 days.

(21) Appl. No.: 13/401,293

(22) Filed: Feb. 21, 2012

(65) Prior Publication Data

US 2012/0173196 A1    Jul. 5, 2012

Related U.S. Application Data

(63) Continuation of application No. PCT/EP2010/062137, filed on Aug. 19, 2010.

(30) Foreign Application Priority Data

Aug. 21, 2009  (GB) .................................. 0914661.4

(51) Int. Cl.
- *G06F 15/00* (2006.01)
- *E21B 47/024* (2006.01)
- *E21B 47/022* (2012.01)

(52) U.S. Cl.
CPC .............. *E21B 47/024* (2013.01); *E21B 47/022* (2013.01)
USPC ............................................. 702/151; 33/304

(58) Field of Classification Search
USPC ............ 702/150, 151, 154; 33/302–304, 312, 33/313, 318, 321
See application file for complete search history.

(56) References Cited

U.S. PATENT DOCUMENTS

| | | | |
|---|---|---|---|
| 3,308,670 A | 3/1967 | Grangvist | |
| 4,433,491 A | 2/1984 | Ott et al. | |
| 4,471,533 A | 9/1984 | Van Steenwyk | |
| 5,272,922 A | 12/1993 | Watson | |
| 5,806,195 A * | 9/1998 | Uttecht et al. | 33/304 |
| 2003/0236627 A1 | 12/2003 | Estes | |
| 2005/0022402 A1* | 2/2005 | Ash et al. | 33/321 |
| 2009/0119937 A1 | 5/2009 | Watson | |

FOREIGN PATENT DOCUMENTS

| | | |
|---|---|---|
| GB | 1 437 125 | 5/1976 |
| WO | WO 2009/138842 A1 | 11/2009 |

OTHER PUBLICATIONS

International Search Report, Dec. 4, 2011.
Written Opinion, Feb. 21, 2012.
IB304, Apr. 15, 2011.

* cited by examiner

*Primary Examiner* — Manuel L Barbee
(74) *Attorney, Agent, or Firm* — Fay Sharpe LLP

(57) ABSTRACT

A measurement means for a downhole tool for determining the orientation of the axis of a downhole tool in relation to true north. It includes a gyro sensor capable of measuring angular rate, a rotation means for rotating the gyro sensor about a sensor axis, a measurement means to detect the angular rate at the gyro sensor as it is rotated to form a series of readings, and a processor capable of interpreting the signal amplitude from the series of readings and determining the points of greatest signal amplitude. The processor is also being capable of comparing the phase difference between the actual readings taken against what would be generated with the sensor pointing true north thus providing a downhole tool axis angular deviation from true north. The rotation means rotates the gyro sensor in discrete steps.

14 Claims, 6 Drawing Sheets

_US 8,874,407 B2_

SYSTEM FOR DETERMINATION OF DOWNHOLE POSITION

CROSS-REFERENCE TO RELATED APPLICATIONS

This application is a continuation of international application number PCT/EP2010/062137, having international filing date of Aug. 19, 2010, which was published in English, and which claims priority to Great Britain Patent Application No. GB 0914661.4, filed Aug. 21, 2009, the entireties of which are hereby incorporated by reference as if fully set forth herein.

FIELD OF INVENTION

This invention relates to an apparatus for the determination of downhole position, in particular the orientation relative to the earth's axis and poles.

BACKGROUND

When drilling a well it is desirable to know the path of the borehole that has been drilled. In open hole, where there is no steel casing lining the borehole, the existing method of positioning is to use 3 measurements: measured depth along the borehole from surface, inclination of the borehole to vertical and a measurement of magnetic north taken from a magnetometer. These sensors are placed in non-magnetic housings.

In cased hole operations, or with ferro-magnetic tool housings, it is necessary to use a gyroscope (gyro) sensor in place of the magnetometer to determine position in relation to north because it is not affected by magnetic effects. It is in cased boreholes that gyro's are most beneficial, but they may be used in any configuration of borehole. The existing methods use inertial grade mechanical gyros (rotating mass) which are expensive, susceptible to mechanical shock, have a limited product lifespan of a few thousand hours and require complicated electronic interfaces.

SUMMARY

An object of the present invention is to provide a downhole and practical tool including an accurate gyro sensor, and method to use the gyro sensor, in order to determine the direction of the tool.

According to the present invention, there is provided a measurement means, for a downhole tool, for determining the orientation of the axis of a downhole tool in relation to true north comprising:

a gyro sensor capable of measuring angular rate, a rotation means for rotating the gyro sensor about a sensor axis, a measurement means to detect the angular rate at the gyro sensor as it is rotated to form a series of readings, a processor capable of interpreting the signal amplitude from the series of readings and determining the points of greatest signal amplitude, the processor also being capable of comparing the phase difference between the actual readings taken against what would be generated with the sensor pointing true north thus providing a downhole tool axis angular deviation from true north Preferably, the rotation means rotates the gyro sensor in discrete steps. Preferably, the rotation means rotates the gyro about a sensor axis perpendicular to the angular rate being measured.

Preferably, the present invention uses a solid state MEMS gyro sensor because of its low cost relative to mechanical and optical gyro's and high resistance to shock and vibration relative to mechanical gyros.

DETAILED DESCRIPTION

Figure 1:
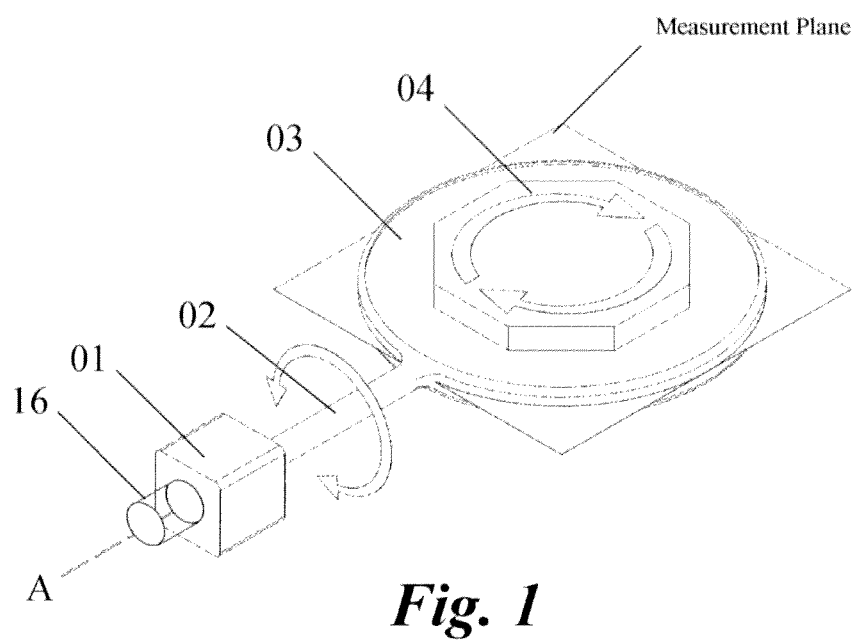
FIG. 1 is a perspective view illustrating an exemplary gyro sensor mounted onto a reference surface flush with its measurement plane.

The gyro system, in its simplest form, may be used to orientate a downhole tool in relation to true north. With reference to FIG. 1, a gyro sensor 04 is mounted onto a reference surface 03 flush with its measurement plane. Surface 03 is attached to a drive motor 01 by a pivot 02 which allows the sensor axis of the gyro sensor 04 to be rotated about axis A, which is the downhole tool long axis. When drilling in a vertical borehole, where the borehole and downhole tool long axes are known, this system can be used to orientate the downhole tool in a predetermined direction. By rotating the gyro sensor through 360 degrees, preferably perpendicular to the angular rate being measured and in discrete steps, and by taking a gyro sensor measurement at each of these steps, it is possible to determine the direction of true north. Knowing the direction of true north, and the offset of the gyro against a fixed feature within the downhole tool, it is possible to orientate the downhole tool for directional tasks.

Alternatively, rather than providing a dedicated circular rotor for the rotation of the gyro sensor, the entire assembly in which the gyro sensor is housed may be rotated; for example, if a gyro sensor is included in a coiled tubing drilling tool with an orienter, the longitudinal axis adjustment can be made with the orienter itself.

Figure 2:
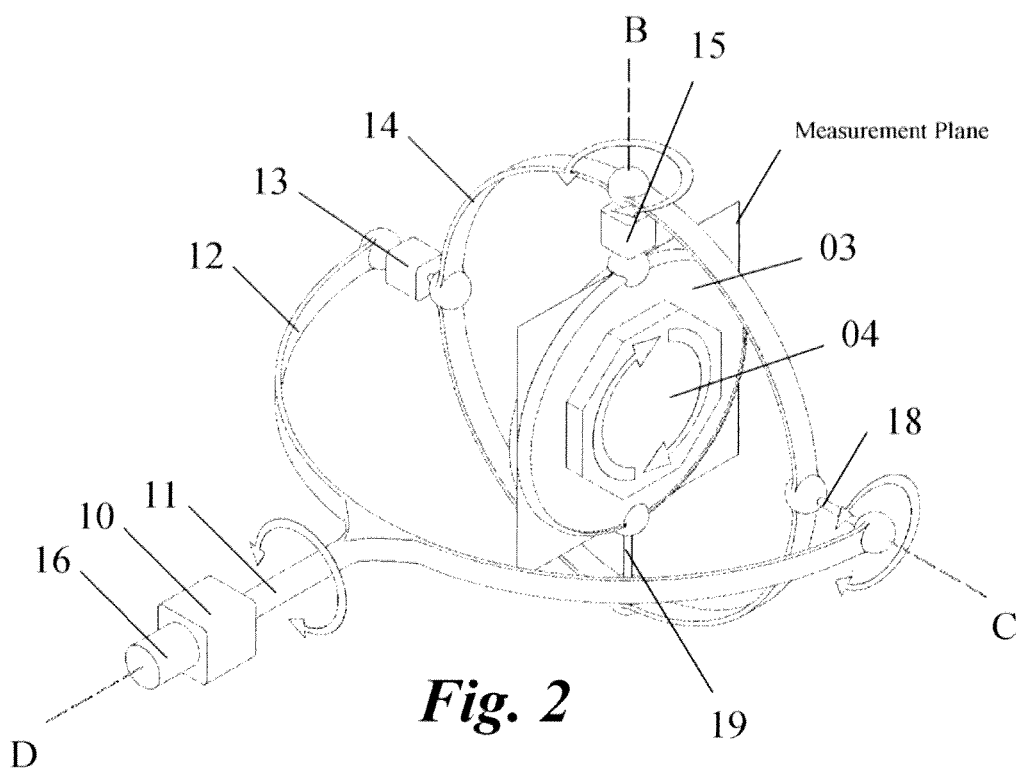
FIG. 2 is a perspective view illustrating an exemplary downhole gyro sensor mounted on a reference surface flush with its measurement plane suspended in a gimbal arrangement.

The present invention gyro sensor may also be used as a means of surveying. Referring to FIG. 2, a downhole gyro sensor 04 is mounted on a reference surface 03 flush with its measurement plane, which is suspended in a gimbal arrangement. The reference surface 03 is mounted in a gimbal ring 14, in which it can rotate about axis B on pivot 19 and driven by drive motor 15. Gimbal ring 14 is mounted in a gimbal mount 12, in which it can rotate about axis C, on pivot 18 and driven by drive motor 13. Gimbal mount 12 is mounted on pivot 11 and drive motor 10 which allows the gimbal ring 14 to rotate about axis D, which is the first alignment axis of rotation. The gimbal arrangement also includes a triaxial accelerometer 16.

When surveying a borehole it necessary to determine downhole tool location in 3D space. This requires measured depth along the borehole from surface, inclination of the borehole to vertical and a measurement of true north. The triaxial accelerometer 16 determines the direction of gravity and so the centre of the earth. The gimbal ring and mount 14, 12 are rotated about the alignment axis indicated by arrows C and D by the drive motors 13, 10, until the sensor axis B, on pivot 19 and drive motor 15 is pointing to the earth's centre. Alternatively or additionally, the direction to the centre of the earth can be estimated from previous readings. Or, the alignment of sensor axis B can be made to the centre of the earth by bias weights. The reference surface 03 is then rotated by drive motor 15, about axis B, on pivot 19, thus producing a set of values which will determine the downhole tool's axial deviation from true north. This value is combined with the depth from surface and inclination to plot the location of the reading using techniques such as the minimum curvature method.

Figure 3:
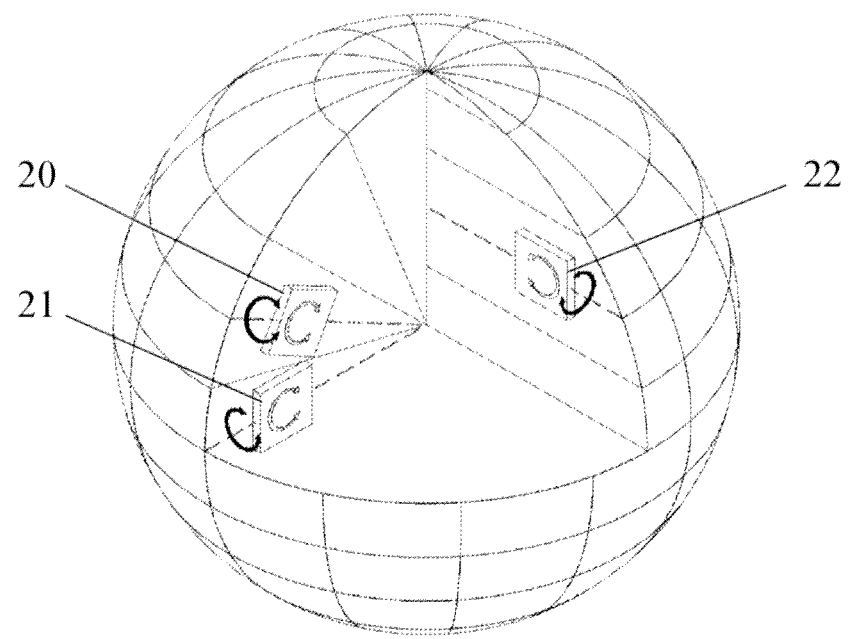
FIG. 3 is a partial sectional perspective view illustrating exemplary sensor locations in the earth.

Referring now to FIG. 3, the earth rotates stably about its true north-south (N-S) axis. This phenomenon can be detected by a sensor that responds to the slow rotary speed (15 deg/hour) of the earth's rotation. This is best done in a plane perpendicular to the axis of the earth's rotation. For a sensor situated at 21, which is on the equator, the plane perpendicular to the earth's axis of rotation is perpendicular to a vector to the centre of the earth, i.e. the sensor axis. Where the sensor is situated away from the earth's equator, it will be seen that when the sensor axis points to the centre of the earth as shown in 20, the plane in which the sensor rotates is somewhat inclined to the plane perpendicular to the earth's axis of rotation. In this location and direction the sensor response will be slightly less, but will still enable accurate determination of true north. To improve the sensor response seen in 20, it is possible to orientate the gyro's sensor axis to point at the N-S axis of the earth, as seen in 22, after the first measurement is taken. This will create an optimised signal, regardless of latitude, by ensuring the gyro measurement plane is perpendicular to the angular rate being measured.

Figure 4:
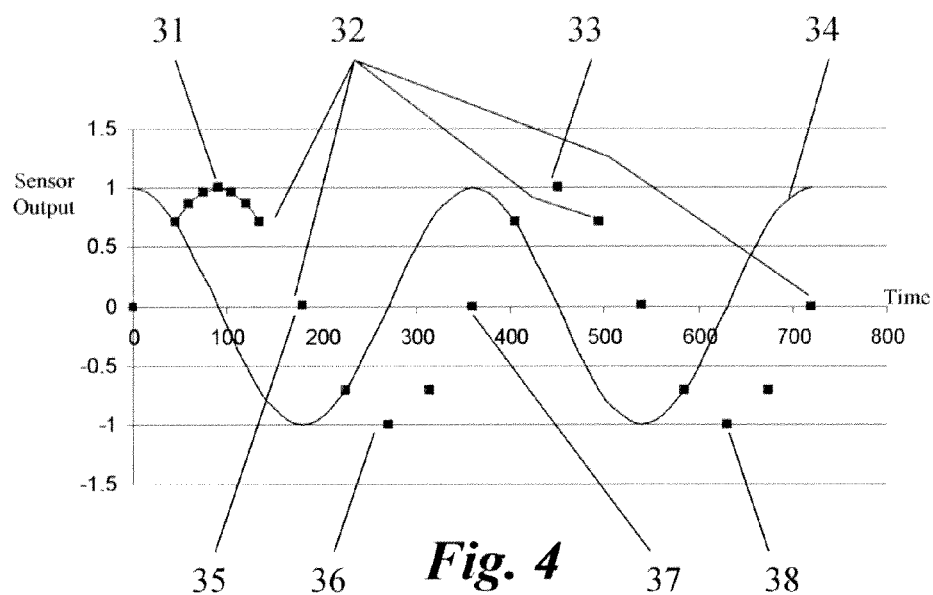
FIG. 4 is a graph illustrating sensor output measurements.

Once the alignment axes are adjusted so that the sensor axis points to the earth's centre, or the N-S Axis, the rotor 16 is rotated using drive motor 15 and pivot 19 from an arbitrary starting point, in discrete steps. At each step the rotor is stopped and a measurement of rate is taken from the gyro sensor 17, shown plotted as a series of readings 31 in FIG. 4. When the measurement plane of the gyro is perpendicular to the N-S axis, the reading will be at maximum amplitude 31, 36, 33, 38. When it is rotated a further 90 degrees, it will be at a minimum 35, 37. Full rotation through 360 degrees will generate a response of the form of a cosine wave. Measuring on the equator, the maximum reading will occur when the measurement axis is pointing due north and the minimum reading will occur when it is pointing due south. By comparing the phase difference between the actual readings taken against the waveform 34 that would be generated with the sensor pointing true north, it is possible to determine the actual heading of the tool. Thus it is possible to know the orientation of the gyro in relation to true north.

The gyro sensor may be started up, gimbals may also be adjusted, and the gyro sensor can be used to take measurements, all relatively quickly. Taking a series of readings quickly reduces the error associated with gyroscope drift. Naturally, the number of readings taken in a revolution can be varied; Allan variance can be used to determine the optimum number of readings given the time necessary for each reading.

Figure 5:
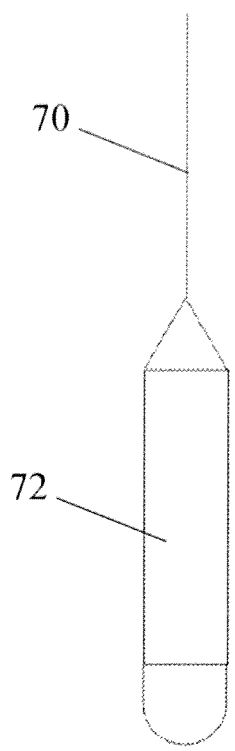
FIG. 5 is a side elevation view illustrating an exemplary Gyro sensor mounted in a downhole tool and deployed on a wireline.

Referring to FIG. 5, the gyro sensor is mounted in a downhole tool 70, and deployed on a wireline 72 down a borehole, measuring the orientation of the tool (and therefore the borehole) relative to true north at various points along the borehole. Since the gyro sensor does not depend on detecting magnetic north, the downhole tool the sensor is mounted on may be made out of ferrous metal, which allows a cheaper and more compact construction than that of a tool comprising non-magnetic material.

The gyro sensor may be started up, gimbals may also be adjusted, and the gyro sensor can be used to take measurements, all relatively quickly. Taking a series of readings quickly reduces the error associated with gyroscope drift.

Figure 6:
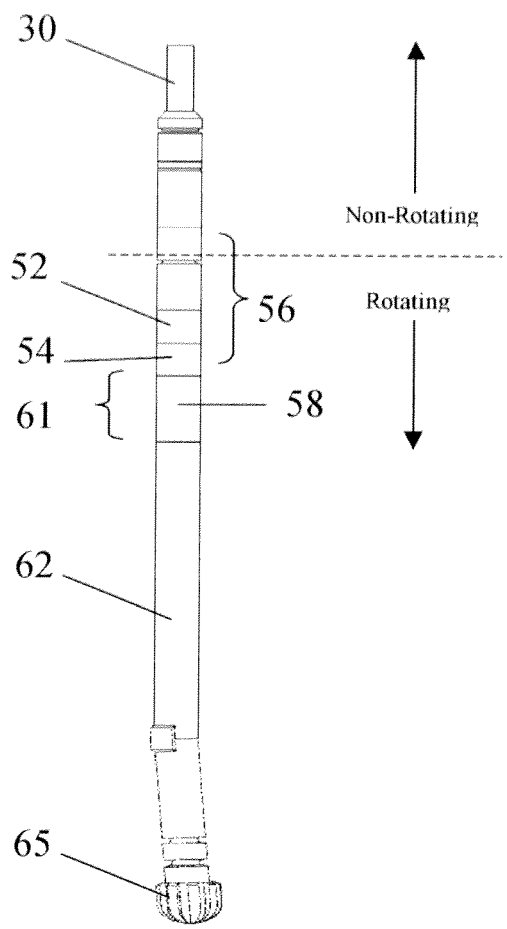
FIG. 6 shows a downhole tool assembly with a drill bit at the end of a drilling motor with a bent section.

In another embodiment of the invention, the rotor 15 is mounted on a pivot 12 and drive motor 14, which is fixed in a downhole tool, the sensor axis defined by the pivot 12 and drive motor 14 being set in a downhole tool perpendicular to the tool's long axis (assuming the tool's long axis to be parallel to the borehole). That is, there is no gimbal arrangement such as gimbals 16, 24 and pivot and drive motors 26, 28, 18, 22. Referring to FIG. 6, the downhole tool assembly comprises a drill bit 65 mounted at the end of a drilling motor with a bent section 62. A sensor section 61 is located above this, itself located below the an orienter section 56. The tool is lowered down the borehole on coiled tubing 30.

The orienter section includes an electric drive mechanism 52 controlled by a control means 54. The electric drive mechanism 52 rotates the sensor section 61 and drilling motor with a bent section 62. In this way, the azimuth of the bent sub altered, so that the path of the borehole can be altered.

The gyro sensor 58 is located in the sensor section 61. To take readings from the gyro sensor, the drive mechanism rotates the sensor section 61 and drilling motor with a bent section 62 in 45 degree steps, the gyro sensor taking a reading after each step, until the drive mechanism has effected a complete 360 degree rotation. As before, the readings will take a sinusoidal form, which by comparison with a reference wave allows the deviation from north to be measured. Without the gimbal arrangement, the sensor axis of the gyro sensor will in general not point to either the centre of the earth or the earth's axis of rotation. The amplitudes of the reading will be reduced by a factor equal to the cosine of angle between direction in which the sensor axis points and the line lying in the plane perpendicular to the earth's axis of rotation which points to the earth's axis of rotation. Provided the reduction is not too small, a determination of true north relative to the downhole tool can be made from the gyro sensor.

Here, the drilling tool is lowered down the borehole on coiled tubing 30, but the drilling too could also be of the rotary driven type. In this case, the drill can be rotated in discrete 45 degree steps to obtain the necessary readings. Naturally, the number of readings taken in a revolution can be varied; Allan variance can be used to determine whether the optimum number of readings given the time necessary for each reading.

The determination of north (or the measurement readings) may be transmitted to the surface in real time; when combined with a drilling tool, which allows accurate drilling of the borehole and side windows. Alternatively or additionally, the determination of north may be stored for later retrieval, for example when using a wireline deployed downhole tool simply to map an existing borehole.

The invention claimed is:

1. A measurement system, for a downhole tool, for determining the orientation of the axis of a downhole tool in relation to true north, comprising:
 a gyro sensor capable of measuring angular rate,
 a rotation means for rotating the gyro sensor about a sensor axis,
 a pointing means for pointing the gyro sensor in a first direction towards the earth's centre and in a second direction at 90 degrees to the earth's centre, a measurement means to detect the angular rate at the gyro sensor as it is rotated in each of the first and second directions to form a series of readings, a processor capable of interpreting the signal amplitude from the series of readings and determining the points of greatest signal amplitude, the processor also being capable of comparing the phase difference between the actual readings taken against stored data of what would be generated with the sensor pointing true north thus providing a downhole tool axis angular deviation from true north.

2. A measurement system according to claim 1, wherein the rotation means rotates the gyro sensor in discrete steps.

3. A measurement system according to claim 1, wherein the rotation means rotates the gyro about a sensor axis perpendicular to the angular rate being measured.

4. A measurement system according to claim 1, wherein the rotation means comprises a tool orientation means for rotating the part of the downhole tool about the tool axis.

5. A measurement system according to claim 1, wherein the rotation means is contained within the downhole tool and includes a drive motor on which the gyro sensor is mounted.

6. A measurement system according to claim 5, wherein there is included a gimbal arrangement having two axes perpendicular to the sensor axis, which can orient the rotation means and gyro sensor to point the sensor axis towards the earth's axis of rotation.

7. A measurement system according to claim 6, wherein there is included a triaxial accelerometer capable of detecting the earth's gravitational vector.

8. A measurement system according to claim 1, wherein the gyro sensor is a solid state MEMS type gyro sensor.

9. A measurement system according to claim 1, wherein there is a storage means for storing the measured readings or the determination of the orientation of the axis of a downhole tool in relation to true north.

10. A measurement system according to claim 1, wherein there is a transmitter means for transmitting the measured readings or the determination of the orientation of the axis of a downhole tool in relation to true north to the surface.

11. A measurement system according to claim 1, wherein the downhole tool includes a rotary drilling tool.

12. A measurement system according to claim 1, wherein the downhole tool is deployed on coiled tubing.

13. A measurement system according to claim 1, wherein the downhole tool is deployed on wireline.

14. A measurement method, for a downhole tool, for determining the orientation of the axis of a downhole tool in relation to true north, by rotating the gyro sensor about a sensor axis by means of gyro rotating means, measuring the angular rate of a gyro sensor by means of a rotation sensor, comprising the following steps:

adjusting the alignment axes so that the sensor axis points to the earth's centre, then:

a) rotating the gyro sensor from an arbitrary starting point in discrete steps, and b) at each step, stopping the rotor and measuring the rate of the gyro sensor, adjusting the alignment axes so that the sensor axis are 90 degrees to the earth's centre and repeating steps a) and b) to form a series of readings, using at least one processor, interpreting the signal amplitude from the series of readings and determining the points of greatest signal amplitude, using the at least one processor, comparing the phase difference between the actual readings taken against what would be generated with the sensor pointing true north to provide a downhole tool axis angular deviation from true north.

* * * * *